United States Patent [19]

Brandenstein et al.

[11] Patent Number: 4,652,152
[45] Date of Patent: Mar. 24, 1987

[54] SELF-ALIGNING BEARING

[75] Inventors: Manfred Brandenstein, Eussenheim; Hans Meining, Dittelbrunn; Karl F. Kaschube, Niederwerrn, all of Fed. Rep. of Germany

[73] Assignee: SKF GmbH, Schweinfurt, Fed. Rep. of Germany

[21] Appl. No.: 827,220

[22] Filed: Feb. 5, 1986

Related U.S. Application Data

[63] Continuation of Ser. No. 475,337, Mar. 14, 1983, abandoned.

[30] Foreign Application Priority Data

Mar. 13, 1982 [DE] Fed. Rep. of Germany ....... 3209203

[51] Int. Cl.⁴ ................ F16C 23/08; F16C 27/06; F16C 35/07
[52] U.S. Cl. .................................. 384/496; 384/536
[58] Field of Search ............... 384/495, 515, 513, 517, 384/535, 536, 558, 569, 571, 581, 582, 611, 612, 620, 539, 559, 585, 486, 496, 192

[56] References Cited

U.S. PATENT DOCUMENTS

| | | | |
|---|---|---|---|
| 1,064,912 | 6/1913 | Johansson | 384/535 |
| 2,906,572 | 9/1959 | Wroby | 384/536 |
| 2,933,354 | 4/1960 | Primeau | 384/536 |
| 3,309,154 | 3/1967 | Stokely | 384/536 |
| 3,885,840 | 5/1975 | Neder | 384/536 |
| 4,236,767 | 12/1980 | Feldle | 384/539 X |
| 4,489,992 | 12/1984 | Brandenstein et al. | 384/496 |

Primary Examiner—Stuart S. Levy
Assistant Examiner—Lynn M. Sohacki
Attorney, Agent, or Firm—Rosen, Dainow & Jacobs

[57] ABSTRACT

A self-aligning bearing, wherein the bearing has an elastic plastic outer layer for engaging a bearing seat, so that it can be tilted. In order to ensure the alignment in a large range, elastically bendable substantially radially directed projections are formed on the plastic outer surface, and are supported on the radial surface of the bearing seat.

4 Claims, 2 Drawing Figures

SELF-ALIGNING BEARING

This application is a continuation of application Ser. No. 475,337, filed Mar. 14, 1983, now abandoned.

FIELD OF THE INVENTION

This invention relates to a self-aligning bearing arrangement having at least one bearing, preferably a rolling bearing, whose inner ring is force fit on a shaft and whose outer ring is positioned in a bearing seat in a housing, and wherein the outer ring surface is of elastic material with projections extending axially beyond the bearing.

DESCRIPTION OF RELATED ART

A self-aligning bearing of this type is disclosed in U.S. Pat. No. 4,489,992, assigned to the assignee of the present application. In this arrangement the bearing can be tilted in the bearing seat of the housing due to the provision of an elastic outer surface on the bearing, in order to align the bearing with respect to the shaft. In addition, the outer surface has projections extending axially from one of the facing surfaces of the bearing, the projections being elastic and positioning the bearing with respect to a radial surface of the bearing seat. When the bearing aligns itself, it supports itself by means of the axial projections, whereby some of the projections may be compressed more than others. Although in this arrangement alignment is achieved in a determined range of alignment without difficulty, the range of the alignment does not suffice for some applications. This limitation results from the minimum axial yieldability of the axially extending projections. The elastic material of the surface is merely compressed upon the alignment of the bearing and thereby has a compression limit with relatively small movement. Moreover the restoring force of the projections progressively increases, so that the useable region of alignment is even more limited.

SUMMARY OF THE INVENTION

It is therefore the object of this invention to provide a self-aligning bearing which can align itself in a larger range, with substantially consistent force of the projections throughout the range.

In accordance with the invention this object is achieved by providing projections that are arranged to be deformed essentially by bending as opposed to the mere compression employed in known arrangements.

As opposed to purely compressive deformation, a nearly constant force (tending to restore the material to its unstressed state) is obtained in a large range of deformation of the material when the deformation is achieved by the bending of the material (i.e. the force is substantially independent of the degree of bending). Consequently a constant axial force advantageously acts on the bearing throughout a larger alignment range of the bearing. The bearing of the invention thereby provides not only for alignment in a larger range, but also provides a substantially constant force or prestress with respect to the radially extending surfaces (i.e. the surfaces extending in a radial plane) of the bearing seat which supports the projections, throughout the circumference of the bearing, when the bearing is aligned. The desired range of alignment of the bearing and the necessary force exerted by the projections can be varied within wide limits by the selection of the elasticity of the materials employed, and the cross-section, shape and axial length of the projections.

In one embodiment of the invention the projections are in the form of tongues distributed about the circumference and extending at an angle to the central axis of the bearing.

Due to the inclined arrangement of the projections, when the bearing is loaded in the direction of the axis of the bearing, such as occurs upon alignment of the bearing by the support against the radially extending surface of the bearing seat on the projections, the projections are bent to lay closer to the side surface of the bearing. As a result the projections substantially retain their cross-section, and are only bent or curved with respect to the remaining material of the outer surface. This bending process requires the same force in the whole range of bending, up to the point of complete engagement of the projections with the side of the bearing, so that a uniform prestress of the bearing in the aligned position is achieved.

In another embodiment of the invention the projections are axially directed and have end surfaces extending at an angle to the central axis of the bearing.

This embodiment of the invention has special manufacturing advantages, since it can be axially formed after the encircling of the side of the bearing with plastic material, for example in the injection molding process, and consequently can be produced with simple equipment. The inclined ends effect a later deformation of the projections when they come into contact with the radial surfaces of the bearing seat during alignment or insertion of the bearing in the bearing seat.

In accordance with a further feature of the invention the projections are in the form of an annular lip extending completely around the circumference of the bearing and inclined to the central axis.

In this embodiment the lip can produce a large restoring force with relatively smaller wall thickness.

BRIEF DESCRIPTION OF THE DRAWINGS

In order that the invention be more clearly understood it will now be disclosed in greater detail with reference to the accompanying drawings, wherein.

DESCRIPTION OF PREFERRED EMBODIMENT OF THE INVENTION

Figure 1:
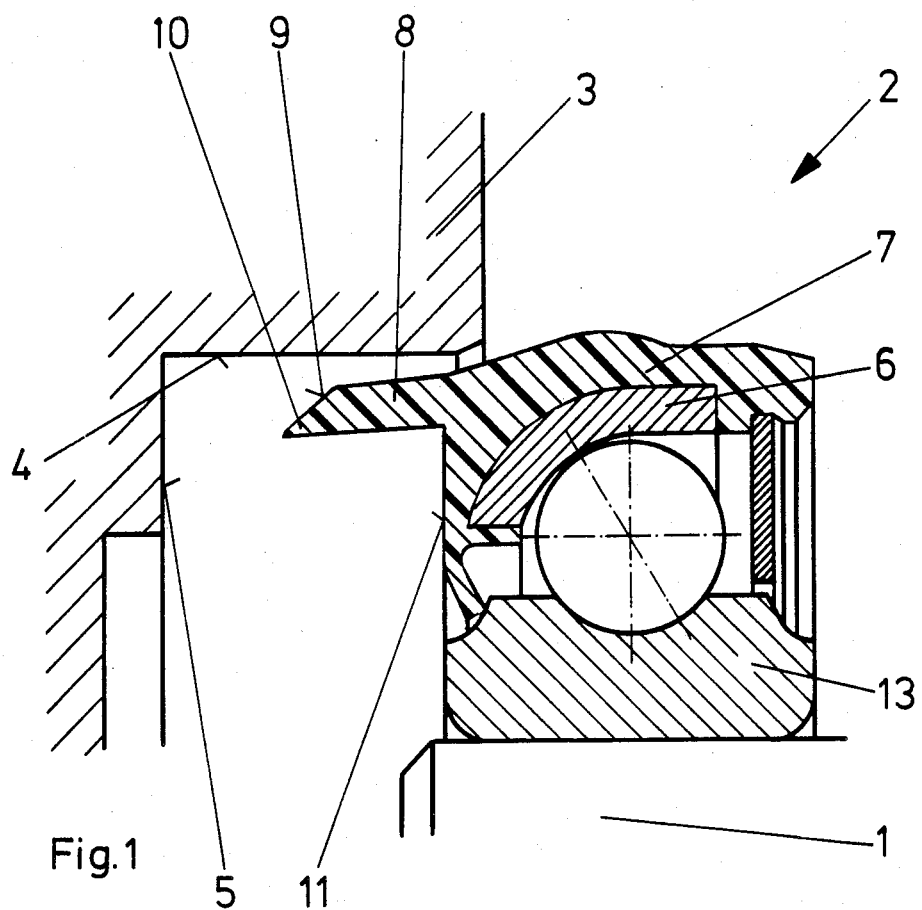
FIG. 1 is a partial longitudinal section of a self-aligning bearing in accordance with the invention, with inclined projections extending in the axial direction from one side thereof, illustrated before the insertion of the bearing in a housing.

The self-aligning bearing illustrated in FIG. 1 is comprised of a shaft 1, a rolling bearing such as ball bearing 2 that is force fit on the shaft 1, and a housing 3 having a bearing seat for the ball bearing 2. The bearing seat is comprised essentially of a bore surface 4 and a radial surface 5. The outer ring 6 of the ball bearing 2 is surrounded by an outer surface 7 of elastic material, whose facing side has several projections 8 distributed about its circumference and extending substantially in the axial direction. The projections 8 have end surfaces 9 inclined to the central axis of the ball bearing 2. The bearing arrangement is illustrated in FIG. 1 in the assembly phase just prior to insertion of the bearing in the bearing seat. The ball bearing 2 must be capable of being aligned with respect to the shaft 1 when it is pressed into the bearing seat of the housing 3, in the event that it is not aligned with the bore axis of the bearing seat, for example, as a result of manufacturing tolerances of the components. The bearing 2 becomes firmly seated in the housing 3 upon insertion in the bearing seat. Reproducible positioning of the ball bearing 2 in the housing 3 in dependence upon the geometrical relationship of the component parts does not result, however, due to the provision of the elastic outer surface 7. The ball bearing 2 also has a firm seat in positions slightly tilted with respect to the bore axis, in other words, it can align itself. The axial projections 8 contribute substantially to this objective. The projections support the ball bearing 2 axially against the radial surface 5 and bend as a result of the forcing of the ball bearing 2 in its seat. The bending process is simplified if each of the points 10 of the projections 9 contact a radial surface 5 and bend towards the central axis of the ball bearing 2 upon firm insertion, as a result of the inclined end surfaces 9. The cross-section of of each individual projection 8 is held constant during the bending and the projections provide an approximately constant axial restoring force on the respective circumferential position of the side surface 11 of the ball bearing 2 in the entire bending range. As a consequence an axial prestress acts uniformly about the circumference of the bearing, so that inner prestressing of the ball bearing 2 does not occur.

Figure 2:
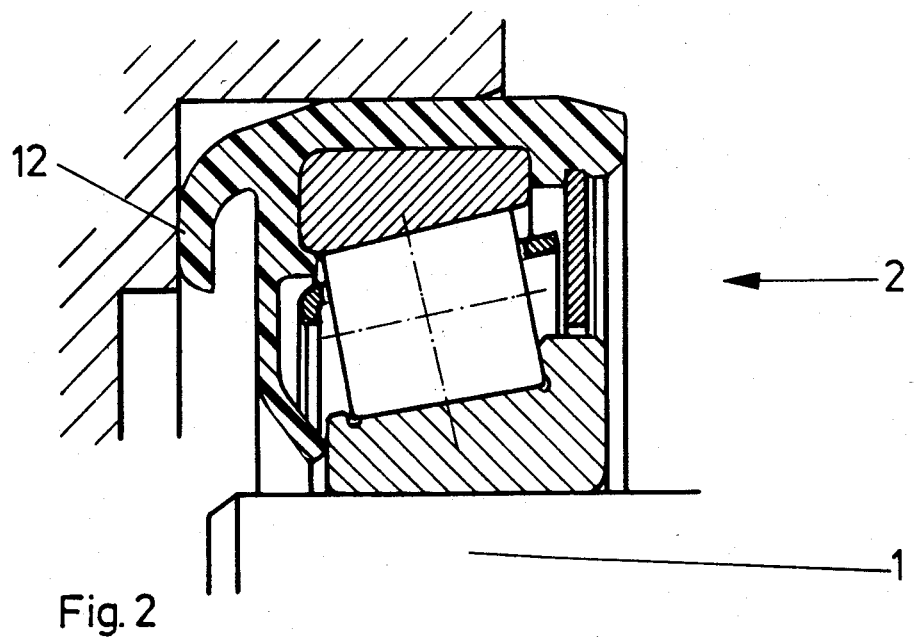
FIG. 2 is a partial longitudinal section of another self-aligning bearing in accordance with the invention with projections extending at an angle to the central axis of the bearing, illustrated during the insertion and alignment of the bearing.

The self-aligning bearing illustrated in FIG. 2 corresponds essentially to the embodiment illustrated in FIG. 1. The tapered roller bearing 2 is however provided with tongues 12 which extend at an angle to the central axis in their rest position (not illustrated). In the illustrated stage of assembly the projections are partly bent and have effected an exact alignment of the ball bearing 2 with respect to the shaft 1.

What is claimed is:

1. In a self-aligning bearing system comprising at least one bearing, a housing configured to form a bearing seat having a first surface in a radial plane and a bore surface, and a shaft, said bearing having an inner ring force-fit to said shaft and having an outer ring comprising an outer surface enclosed by a ring of elastic material with at least one projection extending toward said first surface, and wherein said bearing is firmly held in said bearing seat by said outer surface of elastic material; the improvement wherein said projection extends in a direction to be deformably bent by said first surface when said bearing is positioned in said bearing seat, said projection having a side surface inclined with respect to and toward the central axis of said bearing, said projection having a degree of bending dependent upon the distance separating said first surface and the confronting side face of said projection, the amount of force exerted on said bearing by said first surface being substantially independent of said degree of bending.

2. The self-aligning bearing system of claim 1 wherein said projection is a tongue on the side face of said ring of elastic material which faces said bearing seat, said tongue extending at an angle with respect to the central axis of said bearing.

3. The self-aligning bearing system of claim 1, comprising a plurality of said projections, each of said projections extending in a direction substantially parallel to the central axis of said bearing and having an end surface inclined in a direction at an angle to the central axis of said bearing.

4. The self-aligning bearing of claim 1 wherein said projection comprises circumferentially distributed tongues extending at an incline with respect to the central axis of said bearing.

* * * * *